US008302380B2

United States Patent
Santoso et al.

(10) Patent No.: US 8,302,380 B2
(45) Date of Patent: Nov. 6, 2012

(54) DESULFATION SYSTEMS AND METHODS FOR LEAN $NO_x$ TRAP (LNT)

(75) Inventors: Halim G. Santoso, Novi, MI (US); Bruce F. Hunter, Okemos, MI (US)

(73) Assignee: GM Global Technology Operations LLC

( * ) Notice: Subject to any disclaimer, the term of this patent is extended or adjusted under 35 U.S.C. 154(b) by 623 days.

(21) Appl. No.: 12/485,295

(22) Filed: Jun. 16, 2009

(65) Prior Publication Data

US 2010/0313549 A1    Dec. 16, 2010

(51) Int. Cl.
  *F01N 3/00* (2006.01)
(52) U.S. Cl. .............. 60/285; 60/274; 60/286; 60/299
(58) Field of Classification Search .............. 60/274, 60/284–287, 295–301
See application file for complete search history.

(56) References Cited

U.S. PATENT DOCUMENTS

| | | | | |
|---|---|---|---|---|
| 5,758,493 A * | 6/1998 | Asik et al. | | 60/274 |
| 6,161,377 A * | 12/2000 | Boegner et al. | | 60/274 |
| 6,173,571 B1 * | 1/2001 | Kaneko et al. | | 60/286 |
| 6,571,551 B2 * | 6/2003 | Lundgren et al. | | 60/298 |
| 6,588,205 B1 * | 7/2003 | Kumagai et al. | | 60/298 |
| 6,729,125 B2 * | 5/2004 | Suga et al. | | 60/285 |
| 7,155,899 B2 * | 1/2007 | Beer et al. | | 60/284 |
| 2003/0115855 A1 * | 6/2003 | Miyoshi et al. | | 60/284 |
| 2005/0103001 A1 * | 5/2005 | Kupe et al. | | 60/286 |
| 2008/0148719 A1 * | 6/2008 | Hermansson et al. | | 60/295 |
| 2009/0049824 A1 * | 2/2009 | Kojima et al. | | 60/285 |
| 2009/0077947 A1 * | 3/2009 | Nagaoka et al. | | 60/284 |

* cited by examiner

*Primary Examiner* — Thomas Denion
*Assistant Examiner* — Jesse Bogue

(57) ABSTRACT

A desulfation control system includes a desulfation control module and a spark control module. The desulfation control module initiates a desulfation process in an emission reduction device by increasing temperature of the emission reduction device. The spark control module retards a spark timing to increase the temperature of the emission reduction device in response to the desulfation control module initiating the desulfation process.

18 Claims, 4 Drawing Sheets

US 8,302,380 B2

DESULFATION SYSTEMS AND METHODS FOR LEAN NO$_x$ TRAP (LNT)

FIELD

The present disclosure relates to exhaust systems for internal combustion engines, and more particularly to desulfation systems and methods for lean NO$_x$ trap (LNT) exhaust systems.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

A catalytic converter, for example, a three-way catalytic converter (TWC), may be used with an internal combustion engine to reduce emissions. "Three-way" refers to the three emissions that a catalytic converter reduces, including carbon monoxide (CO), unburned hydrocarbons (HCs) and nitrogen oxide (NO$_x$). For engines that are selectively operated in a lean mode, a lean NO$_x$ trap (LNT) may be provided downstream from the TWC. The LNT supplements the TWC to reduce NO$_x$ emissions when the TWC becomes less efficient under lean exhaust condition.

Fuel injected into the engines may contain sulfur. Sulfur is not combusted in the engines and is carried by exhaust gases through the TWC to the LNT. Sulfur may accumulate in the LNT. Sulfur accumulation adversely affects the trapping efficiency of the LNT.

SUMMARY

A desulfation control system includes a desulfation control module and a spark control module. The desulfation control module initiates a desulfation process in an emission reduction device by increasing temperature of the emission reduction device. The spark control module retards a spark timing to increase the temperature of the emission reduction device in response to the desulfation control module initiating the desulfation process.

A method includes: initiating a desulfation process in an emission reduction device by increasing temperature of the emission reduction device; and retarding a spark timing to increase the temperature of the emission reduction device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
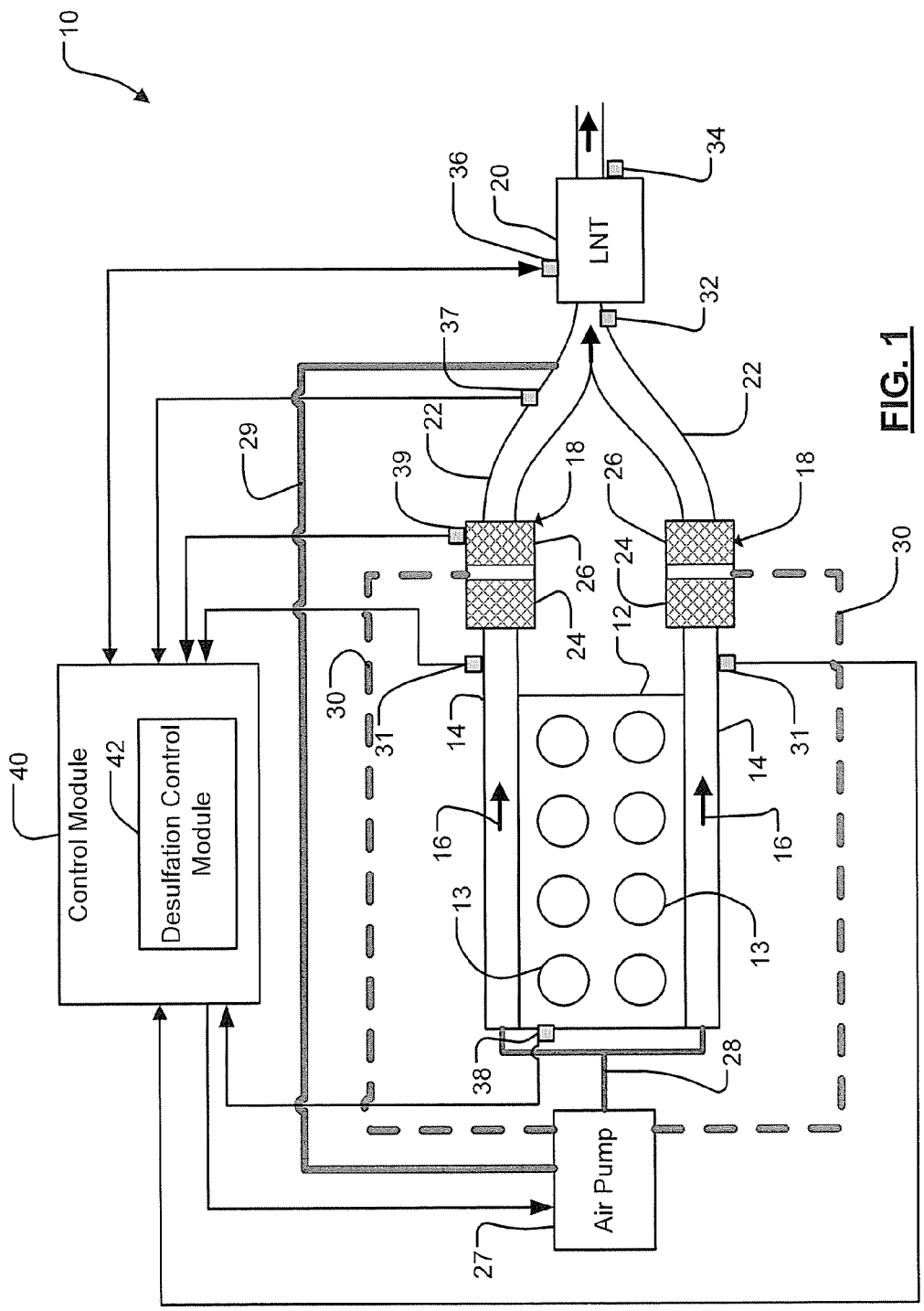
FIG. 1 is a block diagram of an engine system including a desulfation control module according to the present disclosure.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

A desulfation control system for a lean NO$_x$ trap (LNT) according to the present disclosure retards spark timing to increase LNT temperature and transitions the engine to a rich-fuel mode to initiate a desulfation process. The desulfation control system allows the LNT to be quickly heated to a desired desulfation temperature by further supplying oxygen to an exhaust system and/or transitioning the engine to a late dual fuel injection mode.

Referring now to FIG. 1, an engine system 10 includes an engine 12. For example only, the engine 12 may be a port injection engine or a spark direct injection engine (SIDI). The engine 12 may include a plurality of cylinders 13, such as, for example, 2, 4, 6, 8, 10 and 12 cylinders. An exhaust manifold 14 is connected to the engine 12 and directs exhaust gas 16 from the engine 12 to a three-way catalytic converter (TWC) 18. The exhaust gas 16 is then directed through an exhaust pipe 22 to a lean NO$_x$ trap (LNT) 20. The TWC 18 may include an upstream catalyst 24 and a downstream catalyst 26 positioned within a common housing. The upstream catalyst 24 includes catalyst materials suitable for reducing NO$_x$. The downstream catalyst 26 includes catalyst materials that stimulate oxidation of HC and CO molecules.

The LNT 20 supplements the TWC 18 to trap NO$_x$ when the engine 12 is operated in a lean mode and when the TWC 18 is less efficient in a lean exhaust environment. A lean exhaust refers to an exhaust that is generated from combustion of a lean air/fuel mixture with an air/fuel ratio (AFR) greater than a stoichiometric ratio. A rich exhaust refers to an exhaust that is generated from combustion of a rich air/fuel mixture with an AFR less than the stoichiometric ratio.

A secondary air pump 27 provides air to be mixed with the exhaust gas. The secondary air pump 27 is separate from a primary air pump (not shown) that provides air to an intake manifold (not shown) to form an air/fuel mixture. The secondary air pump 27 may supply air through a first air channel 28 and a second air channel 29. Air is supplied to the exhaust manifold 14 through the first air channel 28 and to a region between the TWC 18 and the LNT 20 through the second air channel 29.

Alternatively, the second air channel 29 may be replaced with a third air channel 30 (as shown in dashed lines) that communicates with the TWC 18. Therefore, the air may be supplied to a region of the TWC 18 between the upstream catalyst 24 and the downstream catalyst 26 through the third air channel 30.

A wide range oxygen sensor 31 is provided at an exit of the exhaust manifold 14 to measure the concentration of oxygen in the exhaust gas 16 and determine the AFR of the air/fuel mixture in the cylinders 13. A first $NO_x$ sensor 32 and a second $NO_x$ sensor 34 are provided upstream and downstream from the LNT 20, respectively, to measure $NO_x$ emissions upstream and downstream from the LNT 20. An LNT temperature sensor 36 is provided at the LNT 20 to measure LNT temperature. An exhaust temperature sensor 37 is provided at the exhaust pipe 22 to measure the exhaust temperature. An engine coolant temperature sensor 38 is provided at the engine 12 to measure the temperature of the engine coolant. A TWC temperature sensor 39 is provided at the TWC 18 to measure the temperature of the TWC 18.

A control module 40 includes a desulfation control module 42 that initiates a desulfation process in the LNT 20 when a predetermined amount of sulfur has accumulated in the LNT 20. The desulfation control module 42 initiates the desulfation process by controlling the engine operation and/or by activating the secondary air pump 27. The desulfation control module 42 allows the LNT 20 to be more quickly heated to a desired desulfation temperature for a quick and effective desulfation process.

Figure 2:
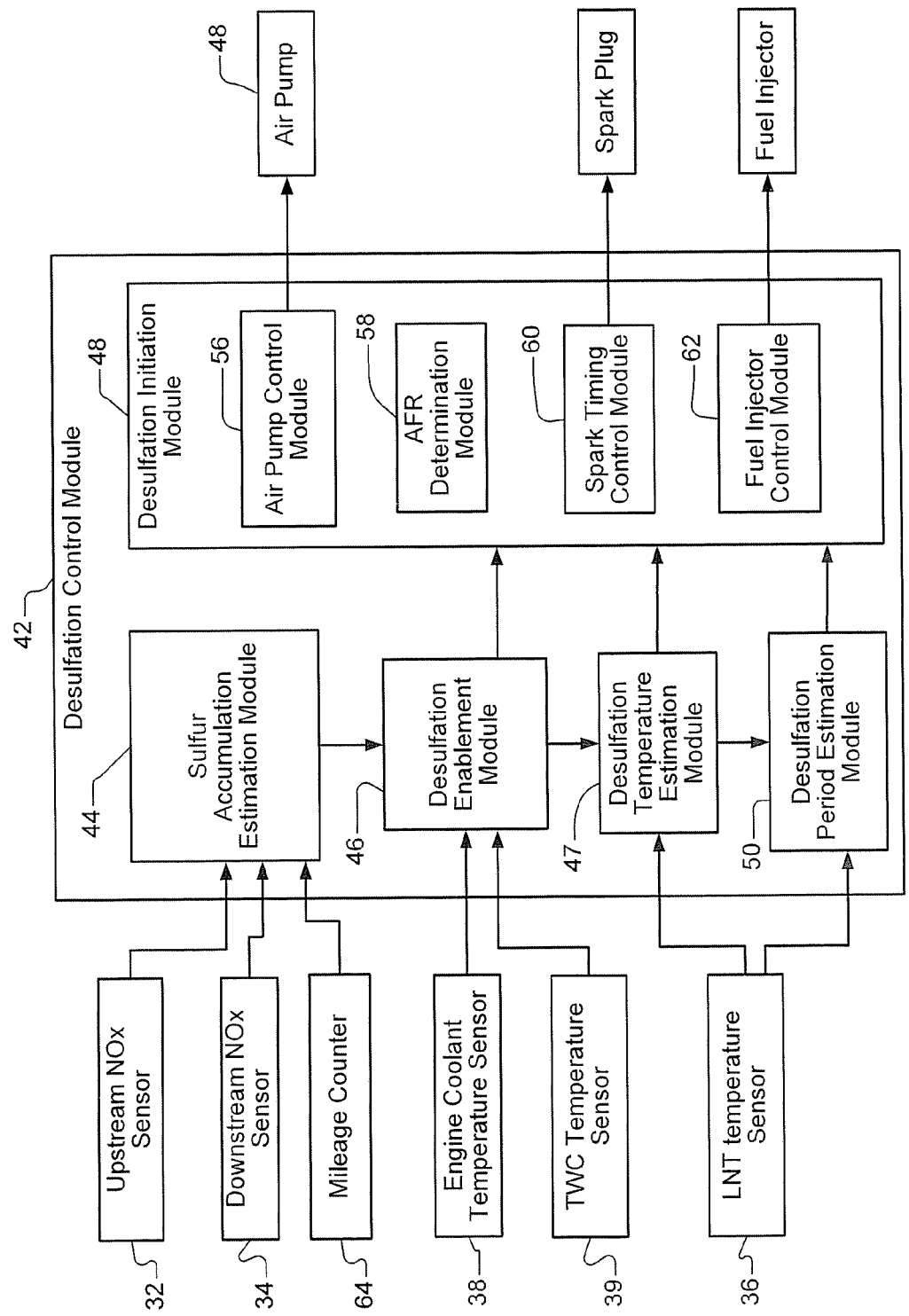
FIG. 2 is a block diagram of a desulfation control module according to the teachings of the present disclosure.

Referring to FIG. 2, the desulfation control module 42 includes a sulfur accumulation estimation module 44, a desulfation enablement module 46, a desulfation temperature estimation module 47, a desulfation initiation module 48, and a desulfation time estimation module 50. The desulfation initiation module 48 may include an air pump control module 56, an AFR determination module 58, a spark timing control module 60, and a fuel injector control module 62.

The sulfur accumulation estimation module 44 estimates sulfur accumulation in the LNT 20. Fuel may contain sulfur. Sulfur is not combusted in the engine 12 and may accumulate in the LNT 20. When sulfur has accumulated a predetermined amount in the LNT 20, the accumulated sulfur may adversely affect the trapping performance of the LNT 20.

Sulfur accumulation may be determined based on one of two methods. The first method includes estimating sulfur accumulation based on a trapping efficiency of the LNT 20. The trapping efficiency of the LNT 20 is defined as a ratio of the $NO_x$ emissions trapped in the LNT over the $NO_x$ emissions that enter the LNT 20. In other words, the trapping efficiency is based on a difference between upstream $NO_x$ emissions and downstream $NO_x$ emissions. In normal conditions, when the trapping efficiency of the LNT 20 is reduced to a threshold efficiency, regeneration of the LNT 20 may be initiated to denitrate the LNT 20. When regeneration of the LNT 20 does not restore the trapping efficiency to a desired level, sulfur may have accumulated a predetermined amount to affect the trapping efficiency. Therefore, the trapping efficiency of the LNT 20 provides an indication of sulfur accumulation.

A second method includes estimating sulfur accumulation based on mileage of a vehicle. Assuming the fuel used in the engine 12 always contains the highest level of sulfur, the amount of sulfur accumulation may be estimated based on mileage of the vehicle 10 that is recorded by a mileage counter 64. For example, the sulfur accumulation estimation module 44 may determine that sulfur has accumulated a predetermined amount after the vehicle has run a predetermined mileage, for example only, 500 or 1000 miles.

The desulfation enablement module 46 determines whether a desulfation process is desired based on desulfation conditions. The desulfation conditions include, but are not limited to, sulfur accumulation, exhaust temperature and engine coolant temperature. The desulfation conditions are met when sulfur has accumulated a predetermined amount, when the engine coolant temperature is above a first threshold temperature and/or when the TWC temperature is above a second threshold. For example only, the desulfation process may be initiated when the engine coolant temperature is above 85° C. and the TWC temperature is above 300° C.

When the engine coolant temperature is below the first threshold temperature, the engine 12 may not be warm enough to generate "hot" exhaust gases. Therefore, more heat is needed to heat the LNT 20 to a desired desulfation temperature if a desulfation process is initiated. In this condition, more desulfation time may be needed to complete the desulfation process, resulting in more fuel consumption due to rich fuel injection during the desulfation process. The desulfation conditions ensure that a desulfation process is initiated in a more fuel-efficient manner. When the enablement conditions are met, the desulfation enablement module 46 activates the desulfation temperature estimation module 47 and the desulfation initiation module 48 to start the desulfation process.

The desulfation temperature estimation module 47 determines a desired desulfation temperature. For example, the desired desulfation temperature may be an optimum temperature under the engine conditions. The desired desulfation temperature may be determined based on the engine conditions, including but not limited to, the exhaust temperature, the current AFR, and the engine load.

For example only, the desired desulfation temperature may be in a range from approximately 500° C. to 750° C. The higher the desulfation temperature, the more efficient the desulfation process. When the temperature of the LNT 20 is relatively low (for example, less than 500° C.), desulfation is slow. When the temperature of the LNT 20 is relatively high (for example, above 750° C.), the LNT 20 may be damaged. Rich fuel is injected during the desulfation process. Therefore, the desulfation temperature estimation module 47 determines a desired desulfation temperature where sulfur can be more quickly removed from the LNT 20 with minimum fuel consumption.

The desulfation initiation module 48 initiates the desulfation process by increasing the temperature of the LNT 20 to the desired desulfation temperature and by generating rich fuel exhaust. As previously described, the LNT 20 is heated to the desired desulfation temperature to ensure efficient desulfation. In addition, a reducing environment is needed in the LNT 20 to allow the sulfur to be reduced from the LNT 20. The reducing environment may be created by providing rich exhaust.

Increasing the LNT 20 to the desired desulfation temperature may be achieved by one of two methods according to the teachings of the present disclosure. In the first method, the temperature of the LNT 20 is increased partially by retarding the spark timing and partially by generating exothermic heat upstream from the LNT 20. In the second method, the temperature of the LNT 20 is increased by retarding spark timing and by transitioning the fuel injectors to a late dual injection mode. In both methods, the spark timing is retarded to increase the LNT temperature.

According to the first method, the spark timing control module 60 retards the spark timing to increase the exhaust temperature. When spark timing is retarded, the air/fuel mixture undergoes a less complete combustion in the combustion chamber to generate more $CO_2$. The increased $CO_2$ results in more heat released to the exhaust gas, thereby increasing the temperature of the exhaust gas and the LNT 20. The degree of spark retard is determined based on a difference between a current LNT temperature and a target LNT temperature (i.e., the desired desulfation temperature). The current LNT temperature may be determined by measurement (for example, from the LNT temperature sensor 36) or by estimation when the desulfation process is initiated.

The air pump control module 56 may be used to further increase the temperature of the LNT. The air pump control module 56 may activate the air pump 27 to supply air (particularly oxygen) to a region upstream from the LNT 20 to be mixed with the exhaust gas. When the air pump 27 is activated, the fuel injector control module 62 controls fuel injectors to inject rich fuel to the engine. When the engine is operated in a rich fuel condition, excessive carbon monoxide (CO) is generated. A portion of CO is oxidized in the TWC 18, while the remaining portion of CO leaves the TWC 18. The remaining portion of CO is mixed with oxygen from the air pump 27, resulting in an exothermic chemical reaction as follows:

$$2CO+O_2 \rightarrow 2CO_2+heat$$

The exothermic chemical reaction releases heat to the exhaust gas and thus heats the LNT 20. The heat is used to heat the LNT 20 without unduly heating the TWC 18. Therefore, the exothermic heat is more efficiently used. Moreover, TWC 18 generally has a temperature higher than that of the LNT 20 under normal engine operating conditions. By initiating the exothermic reaction downstream from the TWC 18, the exothermic heat does not unduly heat the TWC 18 to cause thermal damage to the TWC 18.

The excessive amount of carbon monoxide that needs to be generated in the rich fuel combustion depends on the heat to be applied to the LNT 20. The amount of air or oxygen that is supplied by the air pump 27 depends on the excessive amount of carbon monoxide.

The AFR determination module 58 determines a desired AFR based on engine conditions and based on the stage of the desulfation process. Alternatively, instead of determining the AFR, the AFR determination module 58 may determine a lamda $\lambda$ or an equivalent ratio (EQR). $\lambda$ is defined as a ratio of a desired AFR to a stoichiometric ratio. Equivalence ratio (EQR) refers to a ratio of a desired AFR to a stoichiometric AFR. A stoichiometric AFR refers to an AFR where the fuel is completely oxidized. $\lambda$ gives an indication of percentage of excess air greater than the air in the stoichiometric AFR. The EQR gives an indication of percentage of excess fuel greater than the fuel in stoichiometric AFR. When $\lambda$ is less than one or when the EQR is larger than one, the desired air/fuel mixture is richer than the stoichiometric air/fuel mixture.

In the first method, rich fuel is used for increasing the LNT temperature to the desired desulfation temperature and for creating a rich exhaust environment in the LNT 20. Based on the stage of the desulfation process, the AFR determination module 58 may determine a first AFR when the LNT temperature is below the desired desulfation temperature and a second AFR when the LNT has reached the desired desulfation temperature.

For example, the AFR determination module 58 may determine an AFR of approximately 13.23 (i.e., $\lambda$~0.9). $\lambda$ is less than 1.0 for a rich mixture and greater than one for a lean mixture. The oxygen content in the exhaust gas is monitored by the wide range oxygen sensor 31 to ensure the AFR of the air/fuel mixture is the desired AFR.

According to the first method, the exhaust temperature can be increased more quickly without consuming a significant amount of rich fuel. Moreover, the LNT temperature may be increased without unduly increasing the temperature of the TWC, which has a temperature generally higher than the LNT temperature.

In the second method, the temperature of the LNT 20 is increased by retarding the spark timing and by splitting fuel injection into late dual injections. This method is suitable for a spark ignition direct injection engine. Similarly, the degree of spark timing retardation is determined based on the desired desulfation temperature and the current LNT temperature.

Similar to the first method, the AFR determination module 58 determines an AFR based on engine conditions including the TWC temperature. For example, the AFR determination module may determine that the air/fuel ratio (AFR) is approximately 13.23 (i.e., $\lambda$ is approximately 0.9).

The fuel injector control module 62 transitions the fuel injector from a single injection to a dual injection when the desulfation process is initiated. For example, the fuel injector control module 62 may transition the fuel injectors from an early injection event (i.e., during intake stroke) to a late dual injection event (i.e., during compression stroke). The dual pulse injection enables the spark timing to be retarded without compromising the combustion stability. The spark timing and the injection timing may be adjusted to ensure that the temperature of the TWC 18 does not exceed an upper limit of an acceptable temperature range to damage the TWC 18.

The desulfation time estimation module 50 estimates a desired time for the desulfation process based on the temperature of the LNT 20, the desired desulfation temperature, the desired AFR, the degrees of spark retardment. The lower the current LNT temperature, the longer the desired desulfation time. When the desired time for desulfation elapses, the desulfation process is completed and the desulfation initiation module 48 stops the desulfation process. The desulfation time may be reduced by adjusting degrees of spark retardment and AFR.

Figure 3:
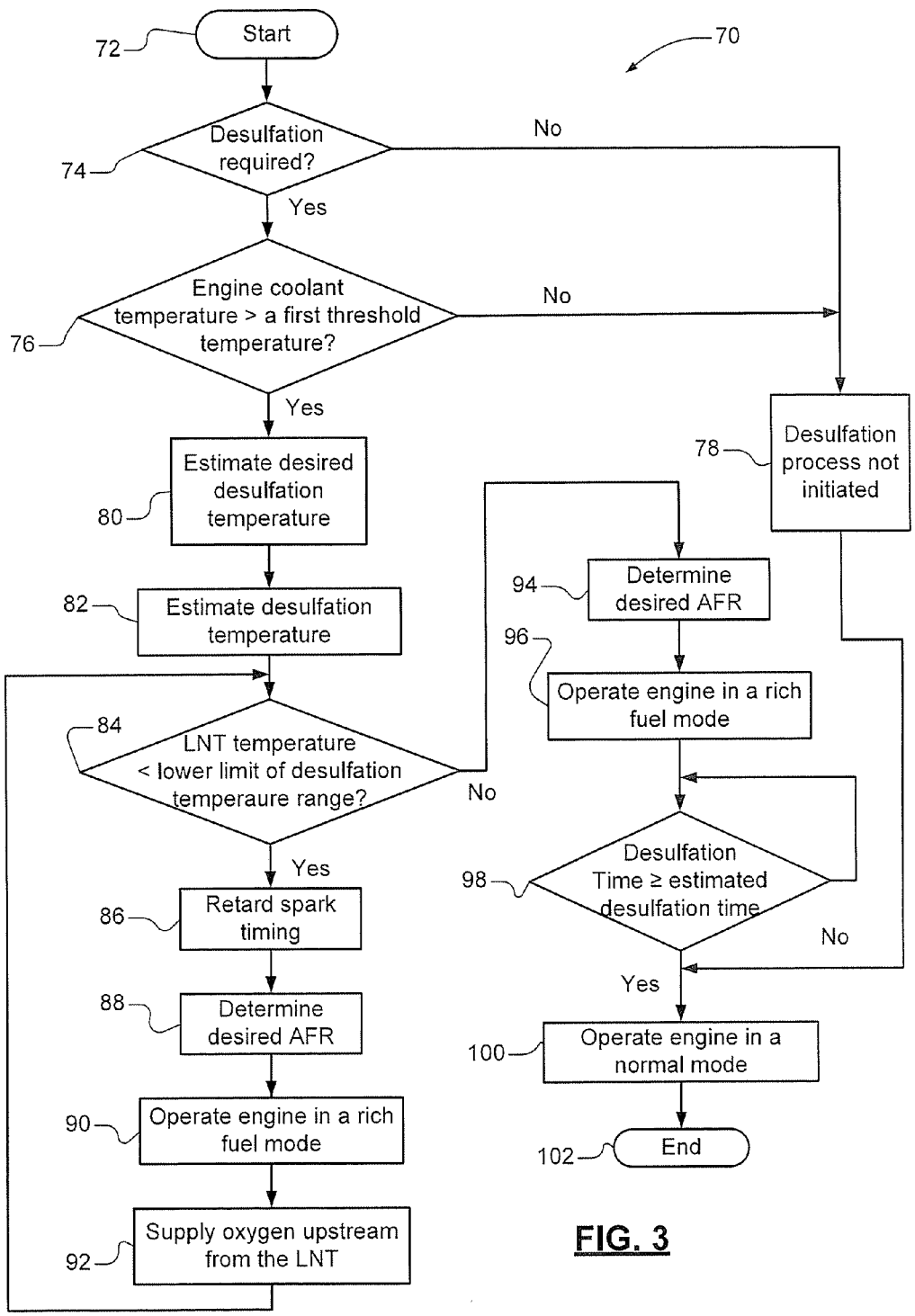
FIG. 3 is a flow diagram of a method for desulfating a lean NO$_x$ Trap (LNT) according to a first embodiment of the present disclosure.
Figure 4:
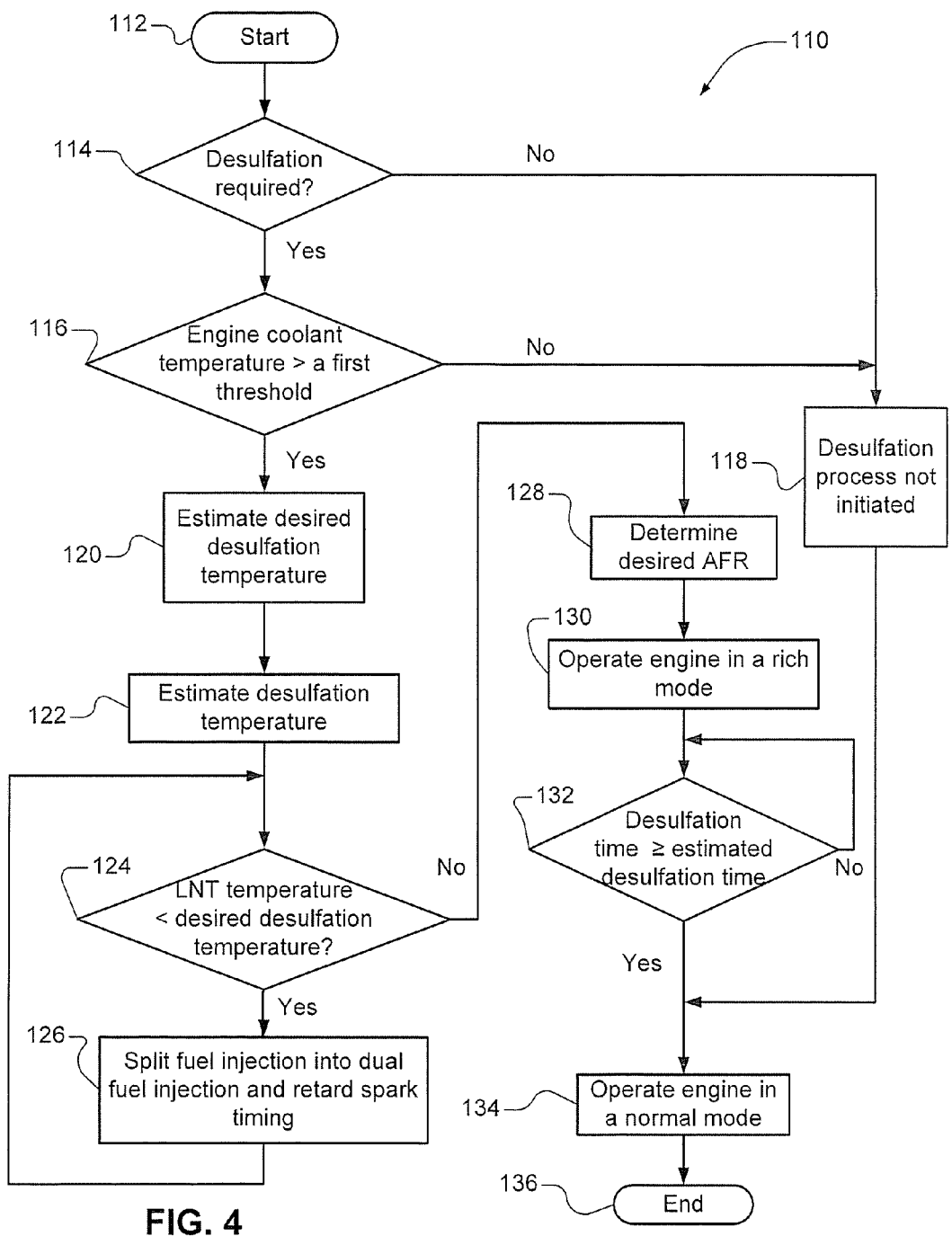
FIG. 4 is a flow diagram of a method for desulfating an LNT according to a second embodiment of the present disclosure.

Referring to FIG. 3, a method 70 of desulfating an LNT 20 starts in step 72. The desulfation control module 42 determines when desulfation is required in step 74. Desulfation is required when sulfur has accumulated a predetermined amount in the LNT 20. When the desulfation is required in step 74, the desulfation enablement module 46 determines whether the engine coolant temperature is greater than a first threshold in step 76. If the engine coolant temperature is below a first threshold in step 76, the desulfation enablement module 46 determines that desulfation process is not initiated in step 78. When the engine coolant temperature is above a first threshold in step 76, the desulfation process is initiated. The desulfation temperature estimation module 47 determines a desired desulfation temperature in step 80. The desulfation time estimation module 50 estimates a desulfation time in step 82. When the LNT temperature is below the desired desulfation time in step 84, the temperature of the LNT 20 is increased by retarding spark timing in step 86.

The AFR determination module 58 determines a desired AFR in step 88. The engine 12 is operated in a rich fuel condition according to the desired AFR in step 90. The air pump is activated to supply oxygen to the TWC 18 or upstream from LNT 20 in step 92. The excessive CO generated by the rich-fuel combustion reacts with the oxygen to generate $CO_2$ and release exothermic heat to heat the LNT 20.

When the LNT temperature becomes equal to or greater than the desired desulfation temperature in step 84, the method proceeds to step 94 to determine a desired AFR under current engine condition for the desulfation process. The engine continues to be operated in a rich fuel condition for the desulfation process in step 96. When the elapsed time reaches the estimated desulfation time in step 98, the desulfation process is completed. The engine is switched to the normal mode in step 100. In the normal mode, the spark timing is returned to the normal setting and the AFR is adjusted to one based on engine torque. The method ends in step 102.

Referring to FIG. 5, a method 110 of desulfating an LNT according to a second embodiment of the present disclosure starts at step 112. The sulfur accumulation estimation module 44 determines when desulfation is required in step 114. When the desulfation is required in step 114, the desulfation enablement module 46 whether the engine coolant temperature is greater than a first threshold in step 116. If the engine coolant temperature is below the first threshold in step 116, the enablement module 46 determines that a desulfation process is not initiated in step 118. If the engine coolant temperature is above the threshold temperature in step 116, the desulfation temperature estimation module 47 estimates a desired desulfation temperature in step 120. The desulfation time estimation module 50 estimates a desulfation time in step 122. When the LNT temperature is below the desired desulfation temperature in step 124, the initiation module 48 retards the spark timing and splits fuel injection into dual fuel injection in step 126. Steps 124 and 126 are repeated until the LNT temperature reaches the desired desulfation temperature.

After the LNT temperature reaches the desulfation temperature in step 124, the AFR determination module 128 determines an AFR in step 128. Based on the determination of the AFR, the fuel injection control module controls timing of the fuel injector to inject more fuel into the combustion chamber in step 130. The engine is thus operated in a rich mode. When the elapsed time exceeds the estimated desulfation time in step 131, the engine is switched to the normal mode in step 134. In the normal mode, the fuel injectors initiate a single fuel injection, the spark timing is returned to the normal settings, and the AFR is adjusted to one based on engine torque. The method 110 ends in step 136.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A desulfation control system comprising:
    a desulfation control module that initiates a desulfation process in an emission reduction device by increasing temperature of the emission reduction device and that initiates the desulfation process in response to a determination that a sulfur accumulation in the emission reduction device is greater than a predetermined amount, a temperature of a catalytic converter upstream from the emission reduction device is greater than a first predetermined temperature, and an engine coolant temperature is greater than a second predetermined temperature; and
    a spark control module that retards a spark timing to increase the temperature of the emission reduction device in response to the desulfation control module initiating the desulfation process.

2. The desulfation control system of claim 1 further comprising a sulfur accumulation estimation module that estimates the sulfur accumulation in the emission reduction device based on a trapping efficiency of the emission reduction device.

3. The desulfation control system of claim 1 further comprising a sulfur accumulation estimation module that estimates the sulfur accumulation in the emission reduction device based on mileage of a vehicle.

4. The desulfation control system of claim 1 further comprising an air pump control module that supplies oxygen to a region upstream from the emission reduction device during the desulfation process.

5. The desulfation control system of claim 4 wherein the air pump control module supplies oxygen to the catalytic converter during the desulfation process and wherein the catalytic converter includes a three-way catalytic converter (TWC).

6. The desulfation control system of claim 4 further comprising a fuel injection control module that injects an air fuel mixture that has an air/fuel ratio less than a stoichiometric ratio during the desulfation process.

7. The desulfation control system of claim 1 further comprising a fuel injection control module that initiates dual fuel injections in each engine cycle during the desulfation process.

8. The desulfation control system of claim 7 wherein the fuel injection control module initiates dual fuel injections in a compression stroke of each engine cycle.

9. The desulfation control module of claim 1 further comprising a desulfation time estimation module that estimates a desulfation time based on temperature of the emission reduction device, a desired desulfation temperature and an air/fuel ratio.

10. The desulfation control module of claim 1 wherein the emission reduction device is a lean $NO_x$ trap (LNT).

11. A method comprising:
    initiating a desulfation process in an emission reduction device by increasing temperature of the emission reduction device;
    initiating the desulfation process in response to a determination that a sulfur accumulation in the emission reduction device is greater than a predetermined amount, a temperature of a catalytic converter upstream from the emission reduction device is greater than a first predetermined temperature, and an engine coolant temperature is greater than a second predetermined temperature; and
    retarding a spark timing to increase the temperature of the emission reduction device in response to initiation of the desulfation process.

12. The method of claim 11 further comprising estimating the sulfur accumulation based on a trapping efficiency of the emission reduction device.

13. The method of claim 11 further comprising estimating the sulfur accumulation based on mileage of a vehicle.

14. The method of claim 11 further comprising supplying air to a region upstream from the emission reduction device during the desulfation process.

15. The method of claim 11 further comprising supplying air to the catalytic converter during the desulfation process, wherein the catalytic converter includes a three-way catalytic converter upstream from the emission reduction device.

16. The method of claim 11 further comprising operating an engine in a rich fuel mode during the desulfation process.

17. The method of claim 11 further comprising initiating a late dual injection when the spark timing is retarded.

18. The method of claim 11 further comprising estimating a desulfation time based on temperature of the emission reduction device, a desired desulfation temperature and an air/fuel ratio.

* * * * *